United States Patent
Ogawa

(10) Patent No.: US 7,200,016 B2
(45) Date of Patent: Apr. 3, 2007

(54) VIDEO CASSETTE RECORDER AND RCC TYPE SWITCHING POWER SUPPLY

(75) Inventor: Takahiro Ogawa, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 665 days.

(21) Appl. No.: 10/738,577

(22) Filed: Dec. 17, 2003

(65) Prior Publication Data

US 2004/0131329 A1    Jul. 8, 2004

(30) Foreign Application Priority Data

Dec. 17, 2002    (JP)    ............ 2002-007997 U

(51) Int. Cl.
*H02M 7/122*    (2006.01)
(52) U.S. Cl. ............ 363/56.01; 363/95; 363/21.07
(58) Field of Classification Search ............ 363/16–20, 363/21.4, 21.12, 95, 97, 56.01, 56.12, 52, 363/131, 21.07; 307/28, 83
See application file for complete search history.

(56) References Cited

U.S. PATENT DOCUMENTS

| | | | | |
|---|---|---|---|---|
| 4,745,299 A | * | 5/1988 | Eng et al. ............ | 307/66 |
| 5,920,466 A | * | 7/1999 | Hirahara ............ | 363/21.02 |
| 6,314,004 B1 | * | 11/2001 | Higuchi ............ | 363/21.07 |
| 6,525,948 B2 | * | 2/2003 | Hsu ............ | 363/56.11 |
| 6,577,511 B2 | * | 6/2003 | Yamaguchi et al. ...... | 363/21.07 |

FOREIGN PATENT DOCUMENTS

JP    2001-34350    2/2001

* cited by examiner

*Primary Examiner*—Rajnikant B. Patel
(74) *Attorney, Agent, or Firm*—Osha Liang LLP

(57) ABSTRACT

An error detection circuit includes: a Zener diode having a cathode connected through a resistor to a second DC output with a higher voltage than that of a first DC output; a voltage divider circuit; and a PNP transistor having an emitter connected to the first DC output, and a base supplied with an output voltage of the voltage divider circuit. A Zener voltage of the Zener diode and a voltage dividing ratio of the voltage divider circuit are set so that the output voltage of the voltage divider circuit is equal to a value obtained by subtracting the base-emitter voltage of the PNP transistor Q1 from the voltage of the first DC output, and that temperature characteristic of the output voltage of the voltage divider circuit is set at a value canceling temperature characteristic of the PNP transistor.

4 Claims, 3 Drawing Sheets

VIDEO CASSETTE RECORDER AND RCC TYPE SWITCHING POWER SUPPLY

BACKGROUND OF THE INVENTION

1. Field of the Invention

The present invention relates to an RCC (Ringing Choke Converter) type switching power supply in which a voltage error of a DC output is detected on the basis of a reference voltage generated by a Zener diode, and a video cassette recorder equipped with the RCC type switching power supply.

2. Description of the Related Art

A configuration in which a reference voltage stabilized by a Zener diode D11 is led to an emitter of a transistor Q11 as shown in FIG. 2 is used for detecting a voltage error of a DC output in a switching power supply or the like. In this case, the voltage range of a DC output 92 allowed to be subjected to error detection is limited to a voltage range higher than the sum of the Zener voltage and the base-emitter voltage of the transistor Q11 for detecting an error. On the other hand, good temperature characteristic can be obtained when temperature characteristic of the base-emitter voltage of the transistor Q11 and temperature characteristic of the Zener diode D11 cancel each other. However, when the voltage of the DC output 92 is set at 5 V, an element exhibiting a Zener voltage of not higher than 4.4 V needs to be used as the Zener diode D11. In this case, the temperature characteristic of the Zener diode D11 is minus. The temperature characteristic of the base-emitter voltage of the transistor Q11 is minus too. Accordingly, total temperature characteristic is poor. It is therefore necessary to use a shunt regulator as an IC for stabilizing a low voltage such as 5 V. This however causes increase in cost of parts because the shunt regulator as an IC is expensive.

A technique for eliminating the disadvantage has been already proposed by the applicant of the present application (see JP-A-2001-034350). In the proposed configuration, a voltage is stabilized by a Zener diode D15 connected to a DC output 93 of 12 V through a resistor R25 as shown in FIG. 3. The stabilized voltage is divided by resistors R26 and R27, so that a voltage at a junction between the resistors R26 and R27 is supplied to a base of a transistor Q25. On the other hand, a voltage of a DC output 94 as a subject of error detection is divided by a voltage divider circuit constituted by resistors R28 and R29, so that an output voltage of the voltage divider circuit is supplied to a base of a transistor Q26. A photo-coupler 95 for feeding a detected voltage error back to the primary side is connected to a collector of the transistor Q26. An emitter of the transistor Q25 and an emitter of the transistor Q26 are connected to each other. Accordingly, a temperature-dependent change in the base-emitter voltage of the transistor Q25 and a temperature-dependent change in the base-emitter voltage of the transistor Q26 cancel each other. As a result, when an element exhibiting good temperature characteristic at 5.6 V is used as the Zener diode D15, the voltage of the DC output 94 can be stabilized with good temperature characteristic if the voltage of the DC output 94 is a voltage (e.g., 5 V) lower than the Zener voltage of the Zener diode D15.

In the aforementioned configuration, the two transistors Q25 and Q26 are however essential for error detection because a temperature-dependent change in the base-emitter voltage of the transistor Q26 for detecting an error must be canceled by a temperature-dependent change in the base-emitter voltage of the transistor Q25. As a result, the number of transistors increases to bring increase in cost of parts.

SUMMARY OF THE INVENTION

It is therefore an object of the invention is to provide a video cassette recorder equipped with an RCC type switching power supply in which increase in the number of transistors used in an error detection circuit can be suppressed even in the case where a voltage of 5 V is stabilized with good temperature characteristic and in which increase in the number of Zener diodes can be prevented even in the case where a fuse is provided on the primary side so that the fuse can be broken well when abnormal voltage increase occurs in the secondary side.

Another object of the invention is to provide an RCC type switching power supply in which a Zener diode that functions as a load on the secondary side to break a fuse on the primary side when abnormal increase occurs in an output voltage on the secondary side is provided so as to serve also as a Zener diode for generating a reference voltage so that increase in the number of Zener diodes can be prevented even in the case where the fuse is provided on the primary side so that the fuse can be broken when abnormal voltage increase occurs in the secondary side.

In order to achieve the object, according to a first aspect of the invention, there is provided a video cassette recorder including: a video cassette recorder section configured to record an audio and video signal onto a video cassette and to play back the audio and video signal recorded on the video cassette; and an RCC type switching power supply configured to supply a power to the video cassette recorder section, wherein the RCC type switching power supply includes: a transformer having a primary coil and a secondary coil; a switching circuit supplied with a primary DC source obtained by rectifying and smoothing a commercial power source introduced through a fuse and configured to switch a current flowing in the primary coil; an error detection circuit configured to detect a voltage error of a first DC output obtained by rectifying and smoothing an output of the secondary coil; and a photo-coupler configured to feed back the voltage error detected by the error detection circuit to the primary DC source, wherein the switching circuit performs the switching in accordance with an output signal output from the photo-coupler and indicating the voltage error to thereby stabilize a voltage of the first DC output, wherein the error detection circuit includes: a resistor having one terminal connected to a second DC output obtained by rectifying and smoothing an output of the secondary coil; a Zener diode having a cathode connected to the other terminal of the resistor, and an anode connected to a ground; a diode having an anode connected to the first DC output, and a cathode connected to the cathode of the Zener diode; a voltage divider circuit configured to divide a voltage output from the cathode of the Zener diode; and a PNP transistor having an emitter connected to the first DC output, a base supplied with an output voltage of the voltage divider circuit, and a collector outputs a collector current for driving a light-emitting diode of the photo-coupler, and wherein a Zener voltage of the Zener diode and a voltage dividing ratio of the voltage divider circuit are configured so that the output voltage of the voltage divider circuit equals to a value obtained by subtracting a base-emitter voltage of the PNP transistor from the voltage of the first DC output, and that a temperature characteristic of the output voltage of the voltage divider circuit is set at a value canceling the temperature characteristic of the base-emitter voltage of the PNP transistor.

According to the first aspect of the invention, the voltage of the first DC output is stabilized to a target voltage.

Further, the temperature characteristic of the first DC output is set as temperature characteristic obtained by correcting the temperature characteristic of the base-emitter voltage of the PNP transistor, that is, the first DC output has good temperature characteristic. When the voltage of the first DC output exceeds the sum of the Zener voltage of the Zener diode and the forward voltage of the diode because of some failure, a current flows into the ground level through the Zener diode. This current brings an overcurrent flowing in the fuse, so that the fuse is broken. That is, the Zener diode serves as an element for generating a reference voltage and also as an element for passing a current for breaking the fuse.

According to a second aspect of the invention, there is provided an RCC type switching power supply including: a transformer having a primary coil and a secondary coil; a switching circuit supplied with a primary DC source and configured to switch a current flowing in the primary coil; an error detection circuit configured to detect a voltage error of a first DC output obtained by rectifying and smoothing an output of the secondary coil; and a photo-coupler configured to feed back the voltage error detected by the error detection circuit to the primary DC source, wherein the switching circuit performs the switching in accordance with an output signal output from the photo-coupler and indicating the voltage error to thereby stabilize a voltage of the first DC output, wherein the error detection circuit includes: a resistor having one terminal connected to a second DC output obtained by rectifying and smoothing an output of the secondary coil; a Zener diode having a cathode connected to the other terminal of the resistor, and an anode connected to a ground; a voltage divider circuit configured to divide a voltage output from the cathode of the Zener diode; and a PNP transistor having an emitter connected to the first DC output, a base supplied with an output voltage of the voltage divider circuit, and a collector outputs a collector current for driving a light-emitting diode of the photo-coupler, and wherein a Zener voltage of the Zener diode and a voltage dividing ratio of the voltage divider circuit are configured so that the output voltage of the voltage divider circuit equals to a value obtained by subtracting a base-emitter voltage of the PNP transistor from the voltage of the first DC output, and that a temperature characteristic of the output voltage of the voltage divider circuit is set at a value canceling the temperature characteristic of the base-emitter voltage of the PNP transistor.

According to the second aspect of the invention, the Zener voltage of the Zener diode and the voltage dividing ratio of the voltage divider circuit are set so that the output voltage of the voltage divider circuit is equal to a value obtained by subtracting the base-emitter voltage of the PNP transistor from the voltage of the first DC output, and that temperature characteristic of the output voltage of the voltage divider circuit is set at a value canceling temperature characteristic of the base-emitter voltage of the PNP transistor. Accordingly, the voltage of the first DC output is stabilized to a target voltage. Further, the temperature characteristic of the first DC output is set as temperature characteristic obtained by correcting the temperature characteristic of the base-emitter voltage of the PNP transistor, that is, the first DC output has good temperature characteristic.

BRIEF DESCRIPTION OF THE DRAWINGS

The above objects and advantages of the present invention will become more apparent by describing a preferred embodiment thereof in detail with reference to the accompanying drawings, wherein.

DETAILED DESCRIPTION OF THE PREFERRED EMBODIMENTS

Referring now to the accompanying drawings, a description will be given in detail of a preferred embodiment of the invention.

Figure 1:
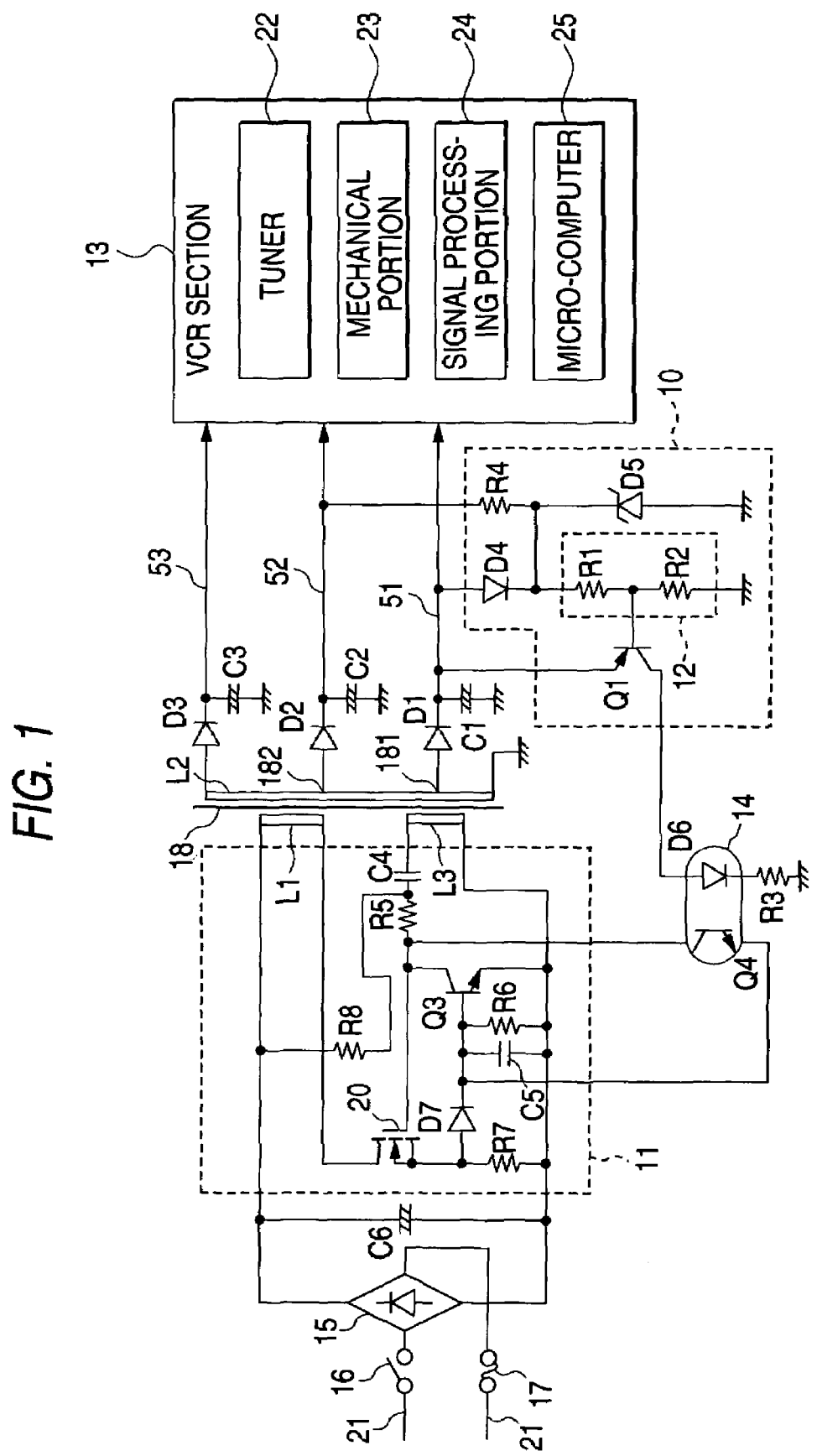
FIG. 1 is a circuit diagram showing electrical connection in an RCC type switching power supply according to an embodiment of the invention in the case where the RCC type switching power supply is applied to a video cassette recorder.
Figure 2:
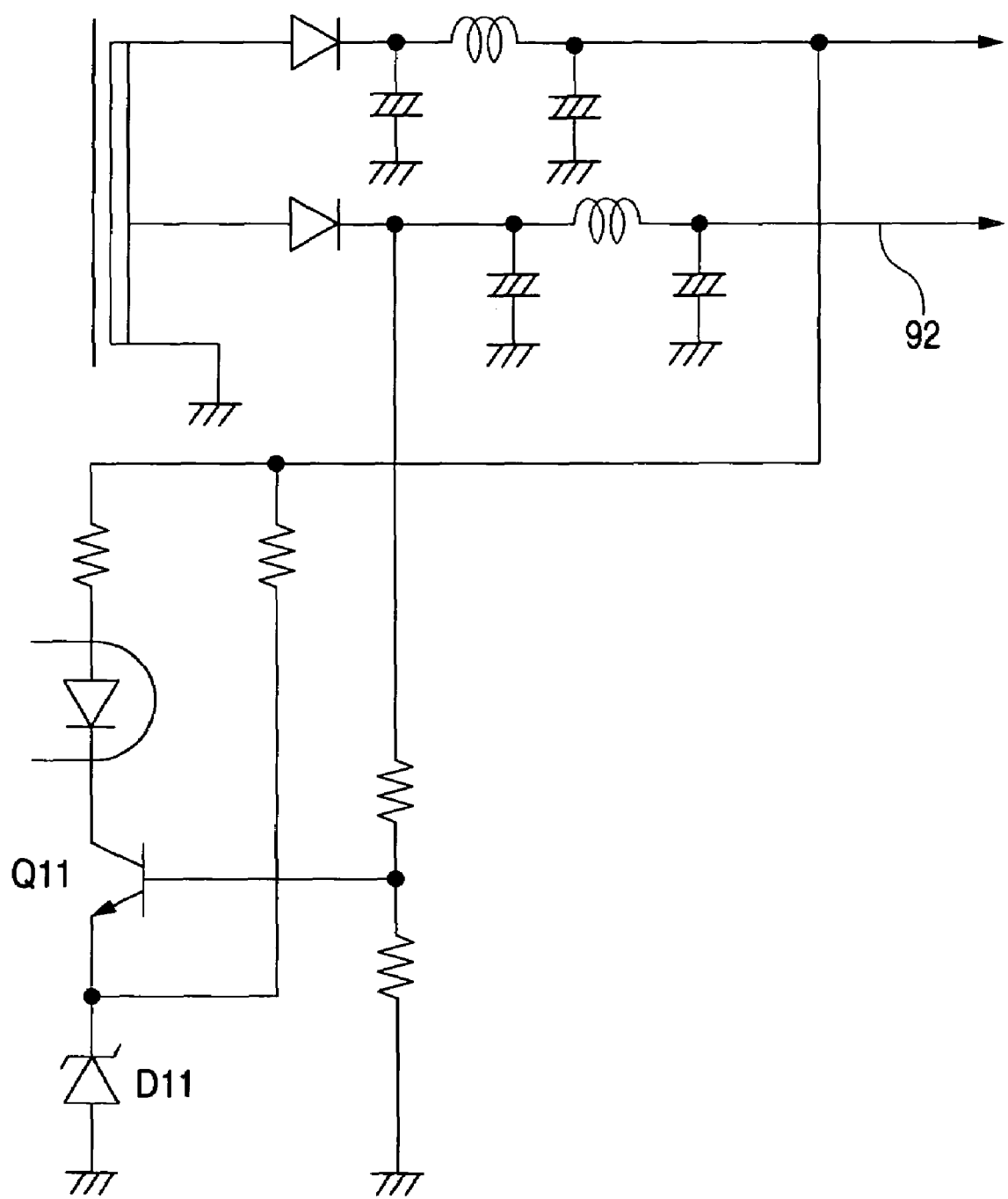
FIG. 2 is a circuit diagram showing electrical connection in an example of the related art.
Figure 3:
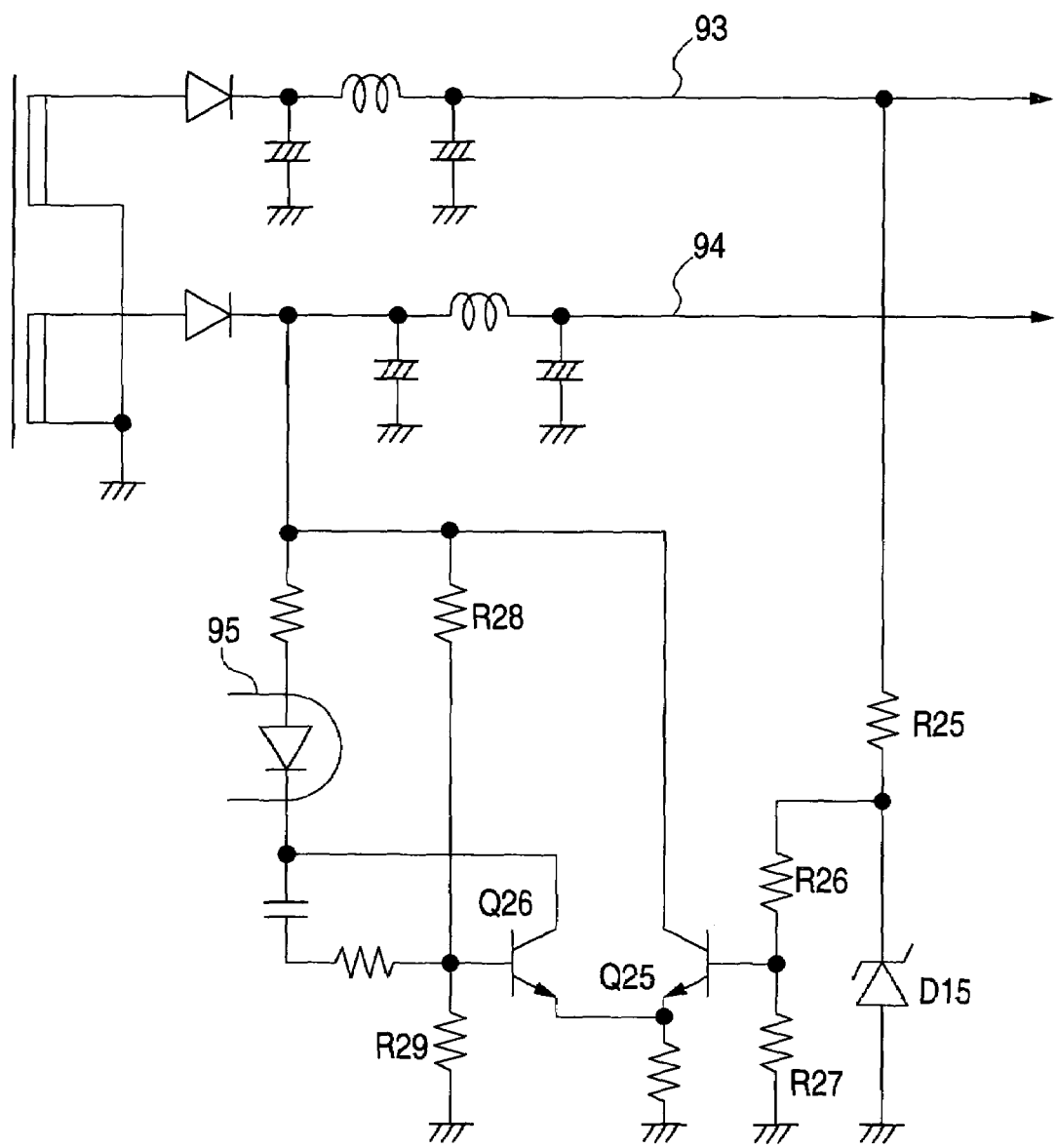
FIG. 3 is a circuit diagram showing electrical connection in another example of the related art.

FIG. 1 is a circuit diagram showing electrical connection in an RCC type switching power supply according to an embodiment of the device in the case where the RCC (Ringing Choke Converter) type switching power supply is applied to a video cassette recorder.

In FIG. 1, a commercial power source 21 is rectified and smoothed by a diode bridge 15 and a capacitor C6 to thereby generate a primary side DC source. A plus level of the primary side DC source is connected to one terminal of a primary coil L1 wound on a transformer 18. A drain of an FET 20 which is a switching element is connected to the other terminal of the primary coil L1. One terminal of a drive coil L3 wound on the transformer 18 is connected to a gate of the FET 20 through a capacitor C4 and a resistor R5 for coupling. A source of the FET 20 is connected to a minus level (hereinafter referred to as primary ground level) of the primary side DC source through a current detecting resistor R7. The other terminal of the drive coil L3 is connected to the primary ground level.

The plus level of the primary side DC source is also connected to between the capacitor C4 and the resistor R5 via a starting resistor R8. The starting resistor R8 is provided for starting a switching circuit 11 (which will be explained later) when a power switch 16 is turned on.

A collector of a transistor Q3 is connected to the gate of the FET 20 in order to control the switching operation of the FET 20. An emitter of the transistor Q3 is connected to the primary ground level. A voltage which is detected by the resistor R7 and which indicates a current flowing in the FET 20 is led to a base of the transistor Q3 through a diode D7. A capacitor C5 for delaying a voltage change and a resistor R6 for discharging the capacitor C5 are connected in parallel with each other between the base of the transistor Q3 and the primary ground level.

A voltage generated in the drive coil L3 is led to a collector of a phototransistor Q4 of a photo-coupler 14 through the capacitor C4 and the resistor R5. An emitter of the phototransistor Q4, which outputs a signal indicating a voltage error of a first DC output 51 on the secondary side, is led to the base of the transistor Q3.

One terminal of a secondary coil L2 wound on the transformer 18 is grounded. A rectifying and smoothing circuit, which is composed of a diode D1 and a capacitor C1, is connected to a tap 181 of the secondary coil L2 to generate the first DC output 51 of 5 V. A rectifying and smoothing circuit, which is composed of a diode D2 and a capacitor C2, is connected to a tap 182 of the secondary coil L2 to generate a second DC output 52 of 12 V. A rectifying and smoothing circuit, which is composed of a diode D3 and a capacitor C3, is connected to the other terminal of the secondary coil L2 to generate a third DC output 53 of 30 V.

A cathode of a Zener diode D5 is connected to the second DC output 52 through a current supply resistor R4. An anode of the Zener diode D5 is grounded. The cathode of the Zener diode D5, which outputs a stabilized reference voltage, is led to a voltage divider circuit 12 composed of resistors R1 and R2. The voltage divider circuit 12 divides the reference voltage given from the cathode of the Zener diode D5 and supplies a tap voltage to a base of a PNP transistor Q1. The first DC output 51 is connected to an emitter of the PNP transistor Q1. A series circuit, which is composed of a light-emitting diode D6 of the photo-coupler 14 and a resistor R3, is connected to a collector of the PNP transistor Q1. A diode D4 is connected in a direction in which a current flows from the first DC output 51 to the cathode of the Zener diode D5.

A video cassette recorder section (hereinafter referred to as VCR section) 13 is a section configured to record an audio and video signal onto a video cassette and to play back the audio and video signal recorded on the video cassette. The VCR section 13 includes a tuner 22 for receiving a commercial broadcast, a mechanical portion 23 for driving a video cassette tape, a signal processing portion 24 for processing a video signal and an audio signal, and a micro-computer 25 for controlling the main operation of the video cassette recorder. The first DC output 51 of 5 V is supplied to the signal processing portion 24 and the micro-computer 25. The second DC output 52 of 12 V serves as a power supply for driving a motor in the mechanical portion 23. The third DC output 53 of 30 V is supplied to the tuner 22.

Supplementary explanation will be made below. A switching circuit 11 is configured by an FET 20, a transistor Q3, a diode D7, three resistors R5 to R7, and two capacitors C4 and C5. When the switching circuit 11 performs a switching operation according to the output of the photo-coupler 14, the first DC output 51 is stabilized to 5 V. An error detection circuit described in claims is provided as a block 10 having a PNP transistor Q1, a voltage divider circuit 12, a Zener diode D5, a diode D4, and a resistor R4. The error detection circuit 10 detects a voltage error of the first DC output 51 and feeds the detected voltage error back to the switching circuit 11 through the photo-coupler 14. A power switch 16 is inserted in one of paths of the commercial power source 21. The fuse 17 is inserted in the other path of the commercial power source 21.

The relation between the collector current of the PNP transistor Q1 and the operation of the switching circuit 11 will be described below before description of the Zener voltage of the Zener diode D5 and the voltage dividing ratio of the voltage divider circuit 12.

When the emitter current of the phototransistor Q4 increases as the collector current of the PNP transistor Q1 increases, the switching circuit 11 performs switching to reduce the voltage of the first DC output 51. When the emitter current of the phototransistor Q4 decreases as the collector current of the PNP transistor Q1 decreases, the switching circuit 11 performs switching to raise the voltage of the first DC output 51.

The switching circuit 11 has the aforementioned relation with the collector current of the PNP transistor Q1. On the other hand, the PNP transistor Q1 raises the collector current when the base-emitter voltage is higher than a predetermined value (about 0.6 V). As a result, the switching circuit 11 reduces the voltage of the first DC output 51. The PNP transistor Q1 reduces the collector current when the base-emitter voltage is lower than the predetermined value. As a result, the switching circuit 11 raises the voltage of the first DC output 51.

On the other hand, the predetermined value (about 0.6 V) of the base-emitter voltage of the PNP transistor Q1 has temperature characteristic of $-1.8$ mV/°C. For this reason, the voltage of the first DC output 51 has temperature characteristic of $-1.8$ mV/°C. if the voltage applied to the base of the PNP transistor Q1 is totally unchanged in spite of change in environmental temperature. What is meant by this is that temperature characteristic of the first DC output 51 is made good if temperature characteristic of the voltage applied to the base of the PNP transistor Q1 can be set at $+1.8$ mV/°C. The PNP transistor Q1 detects a deviation of the first DC output 51 from 5V. It is therefore necessary to set the voltage applied to the base of the PNP transistor Q1, that is, the output voltage of the voltage divider circuit 12 at 4.4 V.

As is obvious from the above description, the Zener voltage of the Zener diode D5 and the voltage dividing ratio of the voltage divider circuit 12 are preferably decided to satisfy the two expressions:

$$VZD \times N = 4.4$$

$$\Delta ZD \times N = 1.8$$

when the temperature characteristic of the voltage dividing ratio of the voltage divider circuit 12 is good, in which VZD [V] is the Zener voltage of the Zener diode D5, $\Delta ZD$ [mV/°C.] is the temperature characteristic of the Zener diode D5, and N is the voltage dividing ratio of the voltage divider circuit 12.

As is obvious from examination into the Zener voltage and temperature characteristic of the Zener diode D5 to satisfy this condition, the Zener voltage has temperature characteristic of $+2.8$ mV/°C. when the Zener voltage is 6.8 V. In this case, the voltage dividing ratio N of the voltage divider circuit 12 is given as follows.

$$6.8 \times N = 4.4$$

$$N = 4.4/6.8$$

Accordingly, temperature characteristic $\Delta$ [mV/°C.] of the output voltage (tap voltage) of the voltage divider circuit 12 is given as follows.

$$\Delta = 2.8 \times 4.4/6.8 = 1.8$$

That is, the aforementioned condition can be satisfied when the voltage dividing ratio of the voltage divider circuit 12 is set at (4.4/6.8) while an element exhibiting a Zener voltage of 6.8 V is used as the Zener diode D5. For this reason, it is a matter of course that this embodiment is configured so that the voltage dividing ratio of the voltage divider circuit 12 is set at (4.4/6.8) while an element exhibiting a Zener voltage of 6.8 V is used as the Zener diode D5.

Incidentally, the voltage dividing ratio and the Zener voltage to make the temperature characteristic of the first DC output 51 best may be decided by way of experiment if it is necessary to make comprehensive consideration inclusive of variation in temperature characteristic of the voltage dividing ratio of the voltage divider circuit 12 and variation in temperature characteristic of the Zener diode D5.

The operation of the embodiment configured as described above will be described below.

When the power switch 16 is turned on, the switching circuit 11 starts a switching operation because a primary side DC source obtained by rectifying and smoothing the commercial power source is supplied to the switching circuit 11. As a result, the first, second and third DC outputs 51 to 53 increase to corresponding voltages respectively. As a result, the cathode voltage of the Zener diode D5 becomes 6.8 V. When the voltage of the first DC output 51 reaches 5 V, a current begins to flow in the collector of the PNP transistor Q1. As a result, the switching circuit 11 performs switching to set the first DC output 51 at 5V, so that the second and third DC outputs 52 and 53 are stabilized to 12 V and 30 V respectively. Accordingly, the VCR section 13 executes a required operation of a video cassette recorder by using the first, second and third DC outputs 51, 52 and 53 as operating power sources.

In the aforementioned state, as described above, the temperature-dependent change of the base-emitter voltage of the PNP transistor Q1 is canceled by the temperature-dependent change of the output voltage of the voltage divider circuit 12 even in the case where the environmental temperature changes. For this reason, the voltage of the first DC output 51 is stabilized with good temperature characteristic.

Assume now that the switching circuit 11 performs switching to raise the voltages of the first, second and third DC outputs 51 to 53, for example, because some failure occurs in a path for feeding the voltage error back to the switching circuit 11. On the other hand, the Zener voltage of the Zener diode D5 is 6.8 V. The forward voltage of the diode D4 is about 0.6 V. For this reason, when the voltage of the first DC output 51 is higher than 7.4 V, a large current flows in the Zener diode D5 through the diode D4. As a result, a large current flows in the fuse 17.

As is obvious from the above description, when the diode D4 and the Zener diode D5 used are elements that are not destroyed before breaking of the fuse 17 even in the case where a large current flows in the elements, the fuse 17 can be broken against the failure of opening the voltage error feedback path to thereby prevent occurrence of other failures. Therefore, elements withstanding the aforementioned current are used as the diode D4 and the Zener diode D5. That is, the Zener diode D5 serves as an element for generating a reference voltage for detecting a voltage error of the first DC output 51 and also as an element for breaking the fuse 17 to prevent enlargement of failure at the time of abnormal increase in the voltages of the first, second and third DC outputs 51 to 53.

Because the voltage of the first DC output 51 is set at 5 V as described above, the Zener voltage of the Zener diode D5 can be set at 6.8 V. Accordingly, the upper limit value of the voltage of the first DC output 51 is limited to 7.4 V when the aforementioned failure occurs. What is meant by this is that the maximum values of the voltages of the first, second and third DC outputs 51 to 53 are limited in order to prevent loads on the first, second and third DC outputs 51 to 53 from being broken. That is, when the first DC output 51 is set at 5 V, breaking of loads on the first, second and third DC outputs 51 to 53 can be more appropriately prevented from being caused by abnormal increase in the voltages of the first, second and third DC outputs 51 to 53.

As described above, in accordance with the device, the Zener voltage of the Zener diode and the voltage dividing ratio of the voltage divider circuit are set so that the output voltage of the voltage divider circuit is equal to a value obtained by subtracting the base-emitter voltage of the PNP transistor from the voltage of the first DC output, and that the temperature characteristic of the output voltage of the voltage divider circuit is set at a value canceling the temperature characteristic of the base-emitter voltage of the PNP transistor. Accordingly, the voltage of the first DC output is stabilized to a target voltage, and the temperature characteristic of the base-emitter voltage of the PNP transistor is corrected. The Zener diode serves as an element for generating a reference voltage and also as an element for passing a current for breaking the fuse. Because the first DC output is set at 5 V, the upper limit of the voltage at the time of abnormality is limited within a range of from 7 V to 8 V. For this reason, increase in the number of transistors used in the error detection circuit can be suppressed when the voltage needs to be stabilized to 5 V with good temperature characteristic. Furthermore increase in the number of Zener diodes can be prevented when the fuse needs to be broken because of abnormal increase in voltage in the secondary side. In addition, the maximum value of the voltage of the first DC output at the time of breaking of the fuse can be limited within a voltage range to make it very difficult to break loads.

According to the device, the Zener voltage of the Zener diode and the voltage dividing ratio of the voltage divider circuit are set so that the output voltage of the voltage divider circuit is equal to a value obtained by subtracting the base-emitter voltage of the PNP transistor from the voltage of the first DC output, and that the temperature characteristic of the output voltage of the voltage divider circuit is set at a value canceling the temperature characteristic of the base-emitter voltage of the PNP transistor. Accordingly, the voltage of the first DC output is stabilized to a target voltage. Further, the first DC output has temperature characteristic given by correcting the temperature characteristic of the base-emitter voltage of the PNP transistor, that is, the first DC output has good temperature characteristic. Accordingly, increase in the number of transistors used in the error detection circuit can be suppressed even in the case where the voltage is stabilized to a low voltage such as 5 V with good temperature characteristic.

When the voltage of the first DC output is higher than the sum of the Zener voltage of the Zener diode and the forward voltage of the diode because of some failure, a current flows into the ground level through the Zener diode. This current causes an overcurrent flowing in the fuse, 50 that the fuse is broken. That is, because the Zener diode serves as an element for generating a reference voltage and also as an element for passing a current for breaking the fuse, increase in the number of Zener diodes can be suppressed even in the case where the fuse is provided 50 that the fuse can be broken when abnormal increase in voltage occurs in the secondary side.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A video cassette recorder comprising:
a video cassette recorder section configured to record an audio and video signal onto a video cassette and to play back the audio and video signal recorded on the video cassette; and
an RCC type switching power supply configured to supply a power to the video cassette recorder section,
wherein the RCC type switching power supply comprises:
a transformer having a primary coil and a secondary coil;
a switching circuit supplied with a primary DC source obtained by rectifying and smoothing a commercial power source introduced through a fuse and configured to switch a current flowing in the primary coil;

an error detection circuit configured to detect a voltage error of a first DC output obtained by rectifying and smoothing an output of the secondary coil; and a photo-coupler configured to feed back the voltage error detected by the error detection circuit to the primary DC source, wherein the switching circuit performs the switching in accordance with an output signal output from the photo-coupler and indicating the voltage error to thereby stabilize a voltage of the first DC output, wherein the error detection circuit comprises:

a resistor having one terminal connected to a second DC output obtained by rectifying and smoothing an output of the secondary coil;

a Zener diode having a cathode connected to the other terminal of the resistor, and an anode connected to a ground;

a diode having an anode connected to the first DC output, and a cathode connected to the cathode of the Zener diode;

a voltage divider circuit configured to divide a voltage output from the cathode of the Zener diode; and a PNP transistor having an emitter connected to the first DC output, a base supplied with an output voltage of the voltage divider circuit, and a collector outputs a collector current for driving a light-emitting diode of the photo-coupler, and wherein a Zener voltage of the Zener diode and a voltage dividing ratio of the voltage divider circuit are configured so that the output voltage of the voltage divider circuit equals to a value obtained by subtracting a base-emitter voltage of the PNP transistor from the voltage of the first DC output, and that a temperature characteristic of the output voltage of the voltage divider circuit is set at a value canceling the temperature characteristic of the base-emitter voltage of the PNP transistor.

2. The video cassette recorder as claimed in claim 1, wherein the first DC output is set at 5 V and the second DC output is set at 12 V.

3. An RCC type switching power supply comprising:

a transformer having a primary coil and a secondary coil;

a switching circuit supplied with a primary DC source and configured to switch a current flowing in the primary coil;

an error detection circuit configured to detect a voltage error of a first DC output obtained by rectifying and smoothing an output of the secondary coil; and a photo-coupler configured to feed back the voltage error detected by the error detection circuit to the primary DC source, wherein the switching circuit performs the switching in accordance with an output signal output from the photo-coupler and indicating the voltage error to thereby stabilize a voltage of the first DC output, wherein the error detection circuit comprises:

a resistor having one terminal connected to a second DC output obtained by rectifying and smoothing an output of the secondary coil;

a Zener diode having a cathode connected to the other terminal of the resistor, and an anode connected to a ground;

a voltage divider circuit configured to divide a voltage output from the cathode of the Zener diode; and a PNP transistor having an emitter connected to the first DC output, a base supplied with an output voltage of the voltage divider circuit, and a collector outputs a collector current for driving a light-emitting diode of the photo-coupler, and wherein a Zener voltage of the Zener diode and a voltage dividing ratio of the voltage divider circuit are configured so that the output voltage of the voltage divider circuit equals to a value obtained by subtracting a base-emitter voltage of the PNP transistor from the voltage of the first DC output, and that a temperature characteristic of the output voltage of the voltage divider circuit is set at a value canceling the temperature characteristic of the base-emitter voltage of the PNP transistor.

4. The RCC type switching power supply as claimed in claim 3 further comprising a diode having an anode connected to the first DC output, and a cathode connected to the cathode of the Zener diode, and wherein the primary DC source supplied to the switching circuit is obtained by rectifying and smoothing a commercial power source introduced through a fuse.

* * * * *